United States Patent [19]

Inoue

[11] Patent Number: 5,179,692

[45] Date of Patent: * Jan. 12, 1993

[54] EMULATION DEVICE FOR DRIVING A LCD WITH SIGNALS FORMATTED FOR A CRT DISPLAY

[75] Inventor: Kazuaki Inoue, Suwa, Japan

[73] Assignee: Seiko Epson Corporation, Tokyo, Japan

[*] Notice: The portion of the term of this patent subsequent to Aug. 22, 2006 has been disclaimed.

[21] Appl. No.: 371,941

[22] Filed: Jun. 27, 1989

Related U.S. Application Data

[63] Continuation of Ser. No. 214,800, Jun. 30, 1988, Pat. No. 4,860,246, which is a continuation of Ser. No. 892,684, Aug. 4, 1986, abandoned.

[30] Foreign Application Priority Data

Aug. 7, 1985 [JP] Japan .................. 60-173707
Jul. 11, 1986 [JP] Japan .................. 61-164144

[51] Int. Cl.$^5$ ............................ G06F 3/14; G06F 5/06
[52] U.S. Cl. ............................ 395/500; 364/237.5;
364/239.1; 364/239.2; 364/270.3; 364/270.9;
364/927.2; 364/934.2; 364/939.4; 364/939.5;
364/DIG. 1; 395/425
[58] Field of Search ........... 364/500, 200 MS File,
364/900 MS File; 395/250, 400, 425, 500, 550

[56] References Cited

U.S. PATENT DOCUMENTS

| | | | |
|---|---|---|---|
| 4,176,400 | 11/1979 | Heckel | 364/900 |
| 4,208,713 | 6/1980 | Berg | 364/200 |
| 4,303,986 | 12/1981 | Lans | 364/900 |
| 4,417,318 | 11/1983 | Hirahata et al. | 364/900 |
| 4,438,326 | 3/1984 | Uchida | 364/900 |
| 4,536,856 | 8/1985 | Hiroishi | 364/900 |
| 4,740,786 | 4/1988 | Smith | 340/784 |
| 4,899,352 | 2/1990 | Cucchi et al. | 375/118 |

FOREIGN PATENT DOCUMENTS

| | | |
|---|---|---|
| 0026602 | 8/1981 | European Pat. Off. . |
| 1556092 | 11/1979 | United Kingdom . |
| 2034156 | 5/1980 | United Kingdom . |
| 2062313 | 5/1981 | United Kingdom . |
| 2084361 | 4/1982 | United Kingdom . |
| 2088103 | 6/1982 | United Kingdom . |

Primary Examiner—Thomas C. Lee
Assistant Examiner—Ken S. Kim
Attorney, Agent, or Firm—Blum Kaplan

[57] ABSTRACT

An interface device for changing the serial data format of the video signal output of a computer intended for display on a cathode ray tube, to a video signal having parallel data format for a liquid crystal display is provided. The device includes a read/write control circuit which responds to a clock signal corresponding to the synchronizing signal of the serial signal and to an asynchronous clock signal. Data signals which were removed from the serial signal and temporarily stored in memory are read out as parallel data signals at the next read cycle when read address counter is counted.

13 Claims, 4 Drawing Sheets

EMULATION DEVICE FOR DRIVING A LCD WITH SIGNALS FORMATTED FOR A CRT DISPLAY

This is a continuation of application Ser. No. 07/214,800 filed on Jun. 30, 1988, now issued U.S. Pat. No. 4,860,246, which is a continuation application of Ser. No. 06/892,684 filed Aug. 4, 1986 now abandoned.

BACKGROUND OF THE INVENTION

The present invention relates to interface devices in which the format of an input signal is converted and temporarily stored in memory for subsequent reading out. More particularly, the invention relates to interface devices for the translation of a video data output signal from a computer which is intended for display on a cathode ray tube into a signal which is suitable for use with liquid crystal displays (LCD).

A known block data transfer circuit utilizes direct memory access and a cycle steal circuit for converting data signals from one format to another. However, in direct memory access block data transfer, the data cannot be read while it is being written into random access memory, nor can it be read when it is being transferred out. For example, even for data format conversion, data cannot be read while it is being written into memory and the data output for forming the display cannot be transferred to the display device. Thus, during that time, data cannot be correctly displayed on the screen. When cycle steal circuits are used, the reading and outputting of the memory are synchronized with the write cycle and the transfer rate of the output signal is limited by that of the input signal and an adequate selection of rates is not available.

SUMMARY OF THE INVENTION

The present invention solves the foregoing problems by providing an interface device in which the input data in a video signal are converted into a format having the desired order and method, and the output signals are made available without limiting the rate of transfer. The interface device includes an input circuit for receiving a data signal from, for example, a personal computer, a random access memory in which the input data is temporarily stored, and a data output circuit for delivery of the re-formatted data signals to, for example, a liquid crystal display device. The operation of the device is controlled by means of a write address counter in which the addresses of memory storage lines are incremented in synchronism with the input signal, a clock generator which operates asynchronously with the write address counter, a read address counter in which addresses for the readout of data from memory to the output circuit are incremented at a rate which is controlled by the clock generator, and a read/write control which has the inputs of the write address and of the read address counters as inputs and which controls selection of the memory write cycle and the memory read cycle on a timesharing basis.

In operation, the interface device writes data received from signals read into the data input circuit to an address specified by the write address counter at a time called for by the read/write control in synchronism with the input signal. Data stored in memory is then read out from an address specified by the read address counter at a time called for by the read/write control and is output to the display device via the output circuit in a new format at a time which is specified by the read/write control. Thus the format of data fed in by the input signal can be changed into another format via the data input circuit and supplied in the new format after temporary storage in the random access memory. Further, the order of data transfer in the output signal can easily be changed by changing the counting method used in the read address counter. Since the read and the write cycles are controlled by the read/write control in a timesharing manner, the output signal need never be interrupted by transfer of data from an input signal into random access memory. Because the read address counter which determines the transfer rate of the output signal functions asynchronously with the write address counter, which is set at the input signal rate, the transfer rate of the output signal is not limited by the input signal and can be set at any value.

It is an object, therefore, to provide an interface device for changing the format of a signal containing data which is received in an input signal at one rate into a signal having a different format while containing the same data which is output at another rate.

It is a further object of the invention to provide an interface device for converting a video data signal for a cathode ray tube display device into a video data signal for driving a liquid crystal display.

It is still another object of the invention to provide a data format conversion device which synchronously accepts input data while providing re-formatted output data at a rate which is asynchronous with the input rate.

A further object of the invention is to permit the use of a liquid crystal display device with signals from personal computers.

A still further object of the invention is to provide a format conversion circuit which, when used with back-up batteries, is capable of supplying signals to a liquid crystal display even when the associated computer is powered down.

Still another object of the invention is to provide a device for converting video signals intended for use in cathode ray tube devices into signals which are useful with other devices such as plasma displays, electroluminescent displays, video printers, etc., as well as for general data conversion.

Still other objects and advantages of the invention will in part be obvious and will in part be apparent from the specification.

The invention accordingly comprises the features of contruction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding the invention, reference is had to the following description taken in connection with the accompanying drawings, in which.

DETAILED DESCRIPTION OF THE INVENTION

Figure 1:
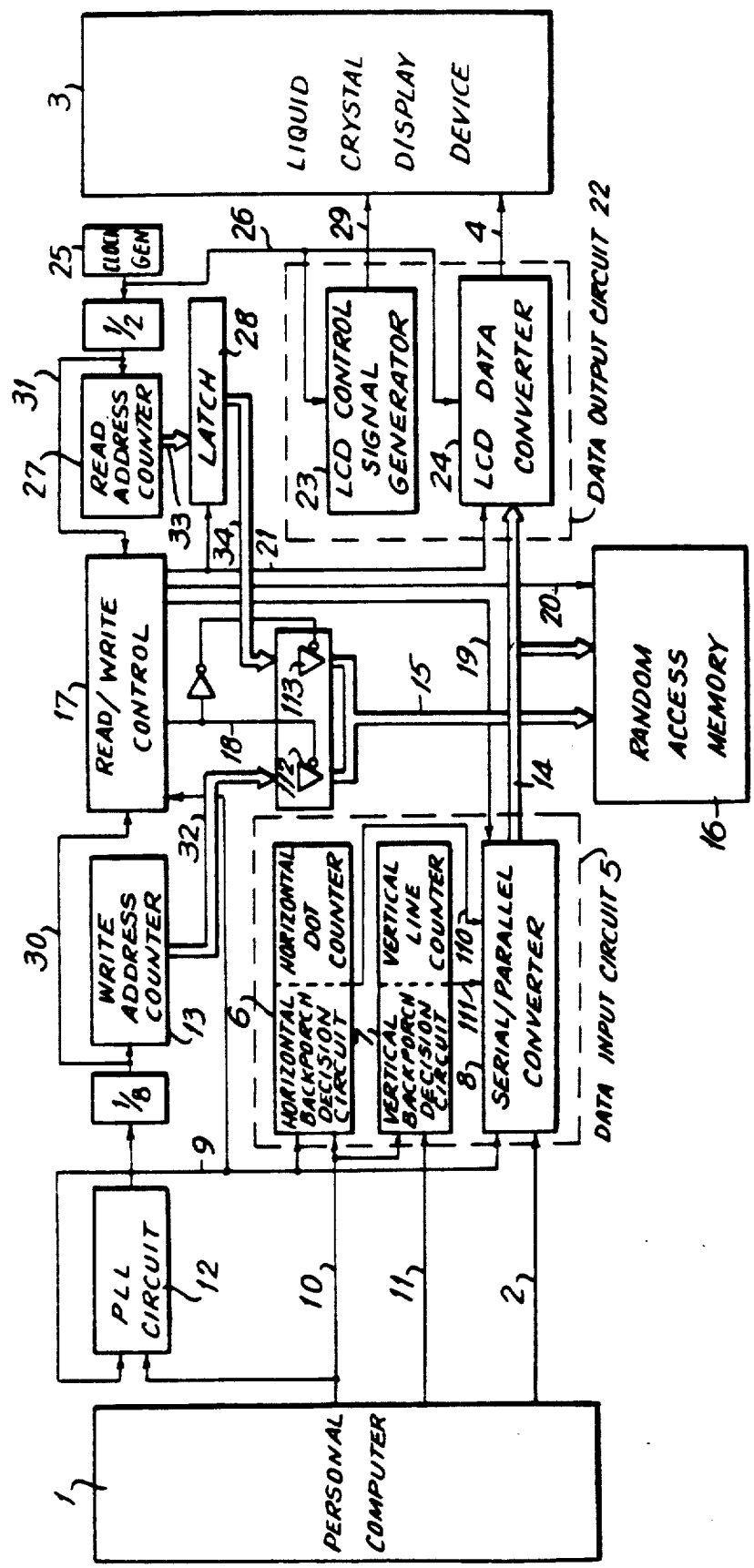
FIG. 1 is block diagram of an interface device fabricated in accordance with the teachings of the invention.

As depicted in the block diagram of FIG. 1, an interface device constructed in accordance with the teachings of the invention receives an input video data signal from a personal computer on line 2 along with horizontal and frame synchronizing signals on lines 10 and 11, respectively. The interface device supplies a data signal 4 in a suitable format for display to a liquid crystal display device 3. The format of input video data signal 2 is shown in detail in FIG. 2 and the format of the output data signal 4 is shown in detail in FIG. 3.

Figure 2:
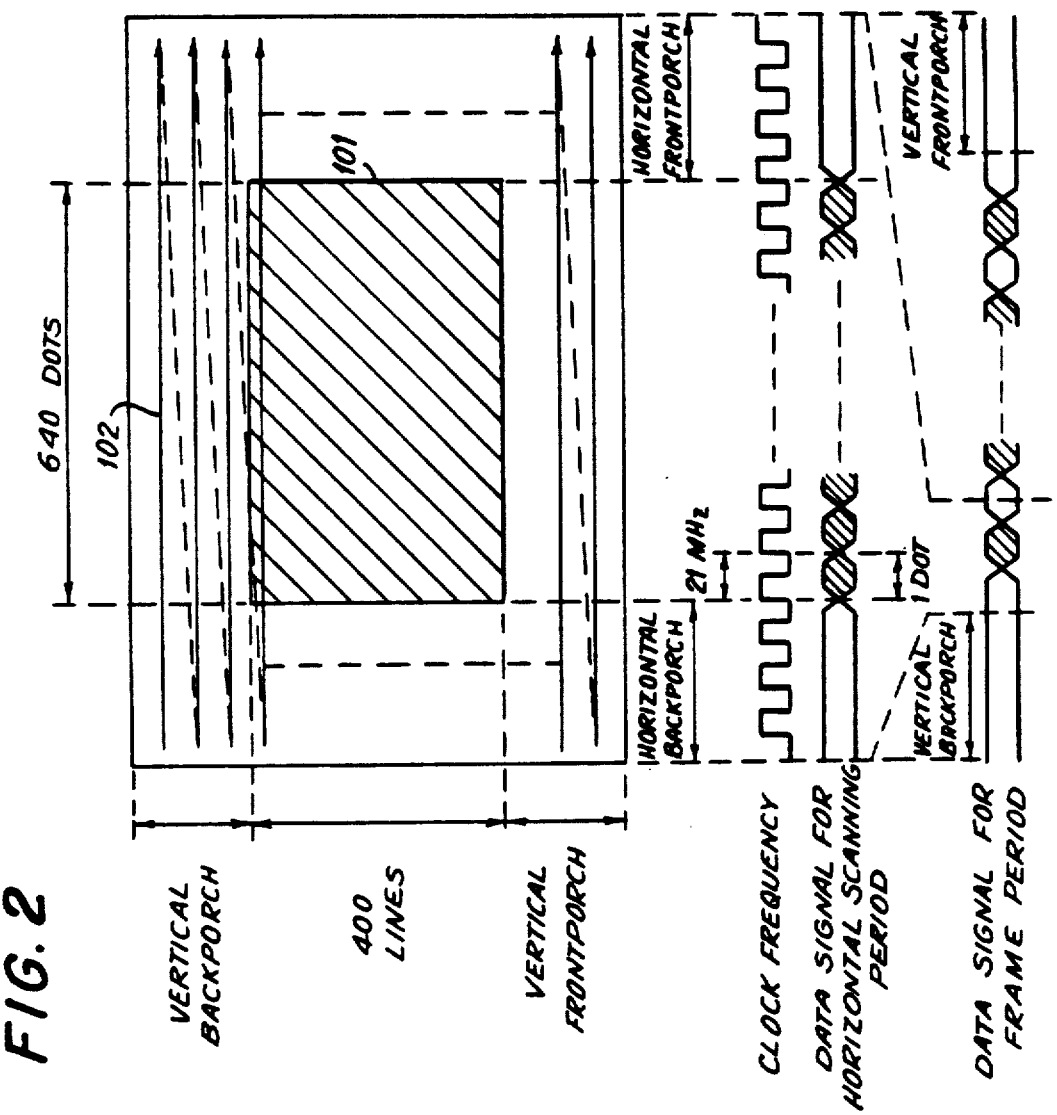
FIG. 2 is a schematic representation of the format of a non-interlaced video data signal accompanied by timing charts showing the transfer clock of the signal, a video data signal for one horizontal scanning period, and a video data signal for the period of one frame.

As depicted in FIG. 2, the video signal from personal computer 1 is non-interlaced and has a screen size of 640 dots by 400 lines. The area in which data is displayed is depicted by the hatched region 101 and the order of data transfer is represented by the sequence of interconnected solid display and dashed return scan lines 102. The video data signals provide the data serial video data signals for sequential scanning in the cathode ray tube display device. Vertical and horizontal back porch and front porch blanking areas are provided in the data stream around the display area during which retrace of the scanning beam is conventionally accomplished.

The video data signal has a data transfer rate of 21 Mbps and a clock frequency of 21 MHz. The relationships of the timing signal, the horizontal scanning signal, and the frame scanning signal are shown in the lines beneath the representation of the video data signal. As can be seen, the order of data transfer is intermittent, since both back porch and front porch periods are provided which are invalid for the transmission of data. The method of input data transfer is serial transfer.

Figure 3:
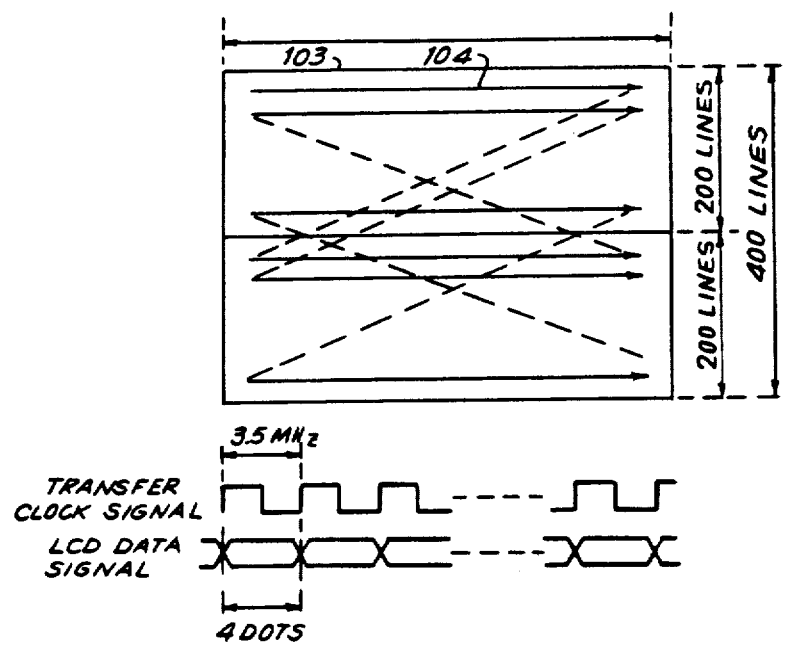
FIG. 3 is a schematic representation of an output signal suitable for a liquid crystal display with representations of the transfer clock and data signal timing signal.

As depicted in FIG. 3, the output video signal 4 to the liquid crystal display is formatted to provide a screen having 640 horizontal dots by 400 lines which are displayed in display data area 103 and in a data transfer order 104 which differs from that of FIG. 2 in that succeeding lines of data are displayed in the upper and lower halves of the display area in alternation. Thus, the liquid crystal display of the illustrative embodiment is of the line sequential scanning type in which the picture elements are formed by transferring one entire line of data to the display at one time. Since data signals for the next line in the liquid crystal display format can be sent within the time required to send one line of data to the display, plural data bits can be sent in parallel. In the embodiment of FIG. 3, four bits are sent in parallel. The data signal for the liquid crystal display has a data transfer rate of 14 Mbps and a clock frequency of 3.5 MHz. The order of data transfer is split screen alternate and the method of data transfer is 4-bit parallel.

Thus, as described above and shown in FIGS. 2 and 3, the input video data signal on line 2 from the personal computer and the data signal which is output to the liquid crystal display on line 4 are different as to the rate of data transfer, order of data transfer, and method of data transfer. While the input and the output signals of the interface device differ in these respects and, particularly, in clock frequency, where there is a great difference, both the input and the output signals of the illustrative embodiment utilize the same frame frequency for the transfer of one screen of data. The frame frequency is usually 60 Hz. The reasons for this are as follows.

In the case of video signals for display using a raster scan, e.g. the signals of FIG. 2, blanking regions, known as the back porch and the front porch, are provided on either side of the active display area. Thus, the data signals for one frame are transmitted within less than two-thirds of the time required for forming the frame and a high clock frequency is required. On the other hand, in the case of the liquid crystal display of FIG. 3, the time required for transferring the data signals for one frame is the same as that required for displaying one frame. Therefore, a high clock frequency is not required. Second, since the cathode ray tube display utilizes dot sequential scanning of an electron beam, the data signals for modulating the beam are transmitted serially. In the case of the liquid crystal display signal, line scanning signals are employed and plural bits are transmitted simultaneously, to the segment driver. As shown in FIG. 3, the use of 4-bit parallel data transfer results in transfer of the data for one frame in one-quarter of the time required for serial data transfer in FIG. 2. In the present embodiment, data from one frame are mixed with data in another frame. Since, personal computers usually renew only part of the data in each succeeding frame, the displayed data is only slightly changed by the transferred data and the change is hardly noticed by the human eye. Further, when the data which form a screen are renewed all at once, there is less mixed data than renewed data and it seems that the screen has changed in an instant.

Keeping the foregoing in mind, the present invention provides for conversion of video signals which are intended for use with a cathode ray tube into the most appropriate format for a liquid crystal display device. Therefore, software developed for use with the cathode ray tube display can also be used, without any modification, for devices having a liquid crystal display. To this end, as shown in the interface device of FIG. 1, data input circuit 5 is provided with a serial/parallel converter 8 in which serial video data on input line 2 is converted to parallel data which is output on data bus 14 to random access memory 16. Timing of the serial/parallel conversion is controlled by a clock signal received on line 9 from phase-lock-loop detector circuit 12. The detector circuit 12 is controlled by the horizontal synchronization signal on line 10 from personal computer 1 which is input thereto and thus the output clock signal on line 9 has such a frequency and a phase that properly control the timing of the video data signal on line 2. In the illustrative embodiment, the frequency of the clock signal on line 9 is 21 MHz.

The data input circuit also includes a horizontal back porch decision circuit 6 and a vertical back porch decision circuit 7 which respond, respectively, to the horizontal synchronizing signal received on line 10 and to the vertical synchronizing signal received on line 11 from the personal computer. Horizontal back porch decision circuit 6 includes a horizontal dot counter, and vertical back porch decision circuit 7 includes a vertical line counter which provides additional control signals to series/parallel converter 8 on lines 110, and 111, respectively, for recognizing both back porch periods as invalid data periods and for recognizing display data period 101 as a valid data period. Thus only the valid display data signals in the video data signal are picked up and transmitted on data bus 14 to random access memory 16.

In the illustrative embodiment, random access memory 16 stores 8 bits as one word. Accordingly, the output of phase lock-loop-detector circuit 12 is divided by 8 to increment write address counter 13 and to control operation of read/write control 17. Control signals are output on lines 19 and 18 from read/write control circuit 17 in synchronous with the clock signal on line 9 to respectively regulate the transmission of data from series/parallel converter 8 to data bus 14 and the transmission of write addresses on line 32 from write address counter 13, via gated amplifiers 112, to address bus 15. A signal from read/write control 17 on line 20 enables memory 16 to receive the data signals received from series/parallel converter 8 on data bus 14 for storage.

Meanwhile, asynchronous clock generator 25 provides a 3.5 MHz. signal on line 26 which is asynchronous with write clock signal 9, and liquid crystal data converter 24 of data output circuit 22 responds to convert data from memory 16 into 4-bit parallel form for transmission at the 3.5 MHz rate to liquid crystal display device 3. The asynchronous clock signal on line 26 from clock generator 25 is fed to LCD control signal generator 23 in data output circuit 22 to time the provision of signals on line 29 to display device 3 for controlling operation. The asynchronous clock signal from generator 25 is also, after being divided by 2, fed on line 31 to read/write control 17 and to read address counter 27 as a count signal. Each time that read address counter 27 is incremented by two 4-bit clock signals, an address is output to read address latch 28 on line 33. Upon receiving a read signal from read/write control 17 on line 21, read address latch 28 transmits the next address to address bus 15, via gated amplifiers 113. Operation of gated amplifiers 113 is controlled by an inversion of the write gate signal on line 18. In this way only one address from write address counter 13 or from read address counter 27 is permitted to be on address bus 15 at a given time. When enabled by a signal on line 20 from read/write control 17, memory 16 outputs data to data bus 14 for transfer to LCD data converter 24.

Conversion of data from memory 16 into the required form for input on line 4 to liquid crystal display device 3 takes place in data conversion circuit 24 in response to read signal on line 21 from read/write control 17 To this end, read address counter 27 successively increments and outputs, in alternation, the address of lines containing data for display on the upper screen and on the lower screen in accordance with the transfer order of the liquid crystal display data signal for liquid crystal display 3.

Figure 4:
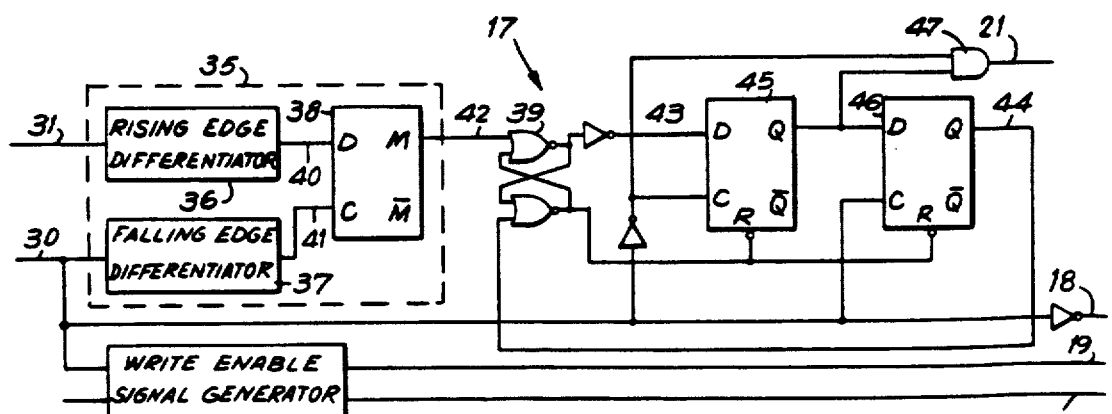
FIG. 4 is a schematic block diagram of the read/write control circuit 1.
Figure 5:
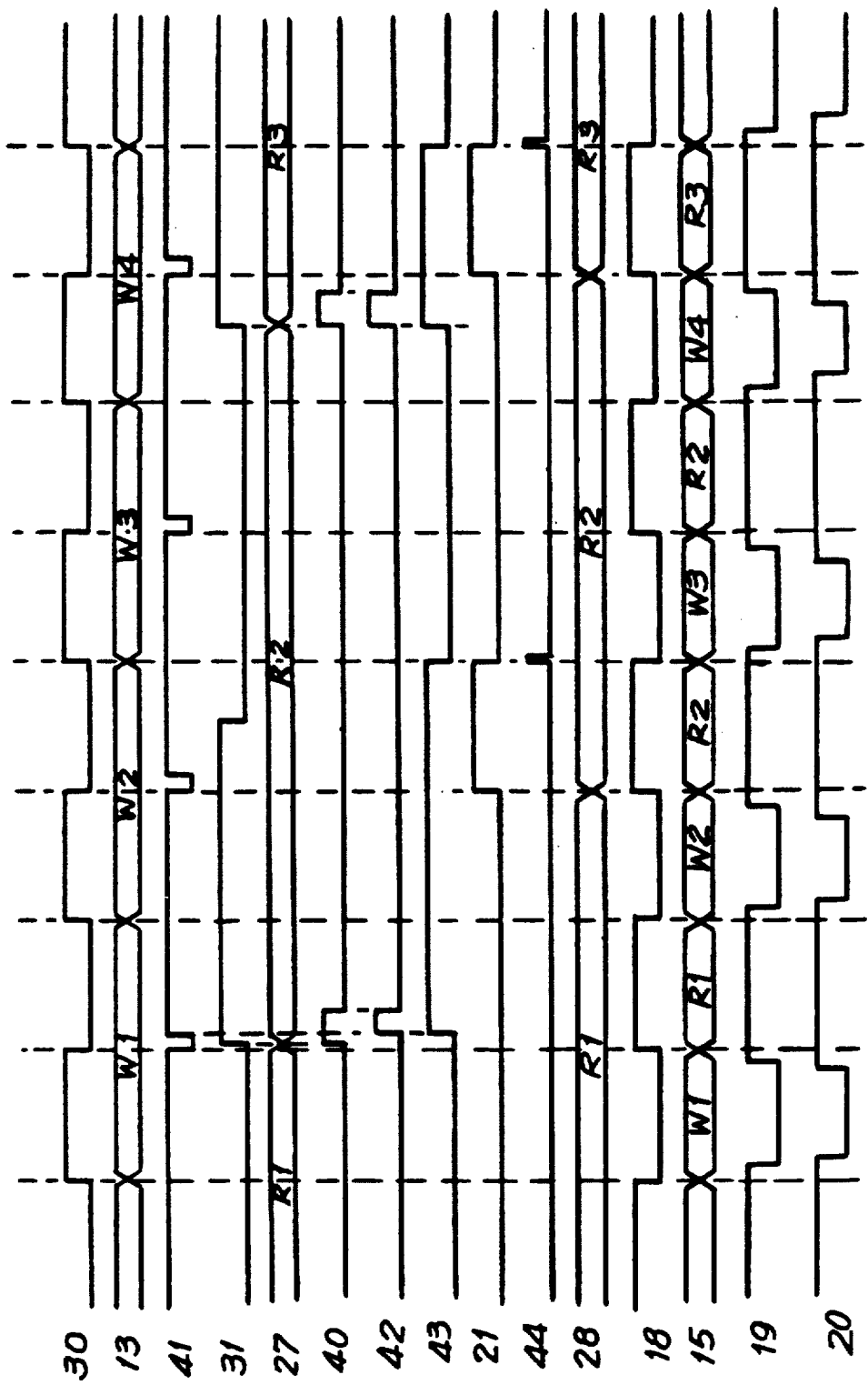
FIG. 5 is a timing chart showing wave forms at enumerated points in FIG. 4.

An illustrative embodiment of a portion of a read/write control 17 is depicted in block form in FIG. 4. The time relation of the various signals at enumerated points in FIG. 4 is shown in FIG. 5. The circuit of FIG. 4 is a key element in the present invention since it enables the asynchronous operation of the writing and the reading of data to and from read only memory 16. This circuit provides write control signals on line 19, 20 and a read control signal on line 21 in response to the modified input clock signal from personal computer 10 on line 30 and the timing signal input on line 31 which was derived from clock generator 25. The waveforms on lines 30 and 31 are shown in FIG. 5 on the lines denoted 30 and 31.

The clock signals on lines 30 and 31 are input (FIG. 4) to read address pulse changing circuit 35 which provides a short, read address change pulse, shown on line 42 of FIG. 5, as an output. The pulse output on line 42 is the result of differentiating the rising edge of clock signal 31 in rising-edge differentiation circuit 36 and of differentiating the falling edge of the signal on line 30 in falling-edge differentiation circuit 37. The respective outputs of the differentiation circuits appear on lines 40 and 41 (see also FIG. 5) and are respectively fed to the D input and the C (clock) input of a latch 38. The output of latch 38 is the signal depicted on line 42 of FIG. 5. As shown in FIG. 5, the pulse width of the signal on line 41 from falling edge differentiation circuit 37 is narrower than the pulse width of signal 40 from rising edge differentiator 36. Therefore, when the rising edge of the clock signal on line 31 comes at the same time as the falling edge of the clock signal on line 30, because the input signal on line 41 to the C input of latch 38 is low, the output signal from latch 38 on line 42 does not change. The output signal on line 42 changes when the signal fed to the C input of latch 38 is high. In other words, when the switching edges of the write clock signal on line 30 and the read clock signal on line 31 come at the same time, the output signal from read address pulse changing circuit 35 on line 42 is delayed so that the new read address will be output in the next cycle. Because the clock signal on line 30 is asynchronous with the clock signal on line 31, these signals can occur in all timing relationships. Therefore, there is a given probability that the falling edge of clock signal on line 30 which controls output timing of write address counter 13 will occur at the same time as the rising edge of the clock signal on line 31 which controls the timing of read address counter 27. At such times, read address pulse changing circuit 35 insures the generation of the control signal on line 21 which times the delivery of a new address to memory 16 and the reading of data memory 16 in the next cycle so that the output of data may be performed successfully.

The circuit of FIG. 4 also prevents misoperation of the circuit which could occur if the read control signals on line 21 were being output while the read address is being changed and vice versa. In this way asynchronous operation of read address counter 27 with write address counter 13 is made possible. Thus, after the read address has been changed and a signal has been output on line 42, setting RS flip-flop 39, the inverted output signal of flip-flop 39 on line 43 (FIG. 5) goes high. The signal on line 43 is fed to the D input of one of two series-connected flip-flops 45 and 46 which, up until then, had been in a reset status. The output of flip-flop 45, ANDed in gate 47 with the clock signal input of write address counter 13 on line 30, is thus synchronized and output on line 21 to actuate latch 28 to latch the address of read address counter 27 and to output the address at the timing synchronized by the clock signal on line 30 of write address counter 13. The signal on line 21 also actuates LCD data converter 24 to receive data on data bus 14 from memory 16 (FIG. 1). Series-connected flip-flops 45 and 46 recycle, and RS flip-flop 39 is reset by the output signal generated from flip-flop 46 on line 44. The signal on line 21 also returns LCD converter 24 to a wait status for the occurrence of the next change of read address.

Application of the write address signal from address bus 32 and the read address signal from address bus 34 to memory address bus 15 is controlled by means of gated amplifiers 112 and 113, respectively, in response to the signal or the inverted version thereof from read/write control 17 on line 18 (FIG. 1). As can be seen in FIG. 1, a write address signal is transmitted on memory address input bus 15 when the signal on line 18 is low, and the read address is transmitted on address bus 15 when signal 18 is high. Thus, by means of read/write control circuit 17, the write clock signal on line 30 effects time sharing of memory address bus 15 between the outputs of write address counter 13 and read address counter 27 so that the respective addresses are fed to memory 16 in turn. It will be noted that read/write control 17 effects renewal of the write address in every cycle, but that the read address is renewed only in the next read cycle after the read address counter has been advanced. Output of the read address control signal on line 21 only occurs at that time, feeding new data from memory 16 to LCD data converter 24. Thus, read/write control circuit 17 brings about synchronization by timesharing of the read cycle and the write cycle even though the read and the write addresses are advanced asynchronously with each other. Asynchronous writing and reading of the data is thus accurately accomplished without data loss.

Accordingly, the present invention is desirably applied to, for example, information display peripherals, such that data loss or data deficiency caused by the user being unable to recognize the displayed characters, such as on a liquid crystal display device or display characters, is prevented.

It is to be noted that, when there is no video data signal input such as during the front and back porch periods of the input signal, the operation of read/write control circuit 17 is controlled by the cycle of read clock signal generator 25. During these periods, the address control signal which is put on line 18 remains high and the read addresses from read address counter 27 are latched through continuously. Therefore, each time that read address counter 27 is advanced, a new read address control signal is output on line 21 and new data are read out from memory 16.

It will be apparent to those skilled in the art that the read/write control circuit of the illustrative embodiment is only one of many arrangements which can be employed to control the operation of the read and write cycles in accordance with the teachings of the invention.

As set forth above, the interface device of the present invention enables conversion of a video data signal which is intended for use with a cathode ray tube display into a data signal which is suitable for use with a liquid crystal display device having a different data transfer rate, a different data transfer order, and a different method of data transfer. In order to achieve this, in the device of the invention, a video signal is fed into a data input circuit where the data signals are removed from the input signal and are then temporarily stored in memory where they are available for read out via a data output circuit. A read/write control circuit controls the addressing and writing of input data asynchronously with the reading of the output data. Therefore, the transfer rate of the output signal can be set at any value needed for the liquid crystal display device.

By means of the foregoing conversion of a video data signal into a liquid crystal display data signal, a large conventional cathode ray tube display which has a large power input, can be replaced by a thin liquid crystal display which requires little power. The compactness and light weight of the liquid crystal display meet a particular need of small personal computers of both desk and portable types. The resulting low power consumption and asynchronized reading out operation enables data to remain displayed using back-up batteries to operate the interface device and the liquid crystal display independently of the computer at power-down periods.

The interface device of the invention has many possible uses in addition to the illustrated embodiment, since it is not necessary to change both hardware and software in order to accomplish the signal conversion. As described above, the data signals are temporarily stored in random access memory, and format conversion is accomplished by reading the data out in a new format. By operating the read address counter asynchronously with the write address counter, the rate of data transfer to the using device is made independent of the rate of input, and the best signal can be provided.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. An interface device for reformatting data containing input video signal, the interface device comprising:
   input means for receiving the input video signals, the input video signals containing data signals in an input;
   memory means for temporary storage of data signals received from the input means, the memory means having addresses at which the data signals are stored;
   first clock means for providing a first clock signal, the clock means being responsive to the input video signal;
   write counter means responsive to the first clock signal for providing at least one write address signal to the memory means;
   second clock means for providing a second clock signal which is asynchronous with the input video signal and the first clock signal;
   read counter means responsive to the second clock signal for providing at least one read address signal to the memory from which data signals are read, and
   read/write control means responsive to the first and second clock signals as inputs, the control means dividing a memory cycle synchronized with the one of the first clock signal and the second clock signal having the shorter cycle so as to produce one writing cycle and one reading cycle in one memory cycle, and controlling the effectuation of the writing operation and the reading operation so that the one of the writing operation and the reading operation which has the shorter corresponding clock signal is always effected in one of the divided memory cycle and the other operation is effected in the other cycle immediately after the counting of the counter means responsive to the clock signal with the longer cycle.

2. The interface device of claim 1 and further comprising output means having the second clock signal and data signal from the memory means as inputs, the output means providing an output data signal in an output format which differs from the input format.

3. The interface device of claim 2, wherein the memory means stores a predetermined number of data signals at each address and further comprising:

means for dividing the second clock signal by the predetermined number to provide a signal for controlling output by the output means of the data signal in the output data signal.

4. The interface device of claim 3, and further comprising:

display device means having the output data signal and a control signal as an input; and a control signal generation means responsive to the second clock signal for providing the control signal.

5. The interface device of claim 1, wherein the input video signal comprises serial data signals and further comprising:

serial-parallel conversion means in the input means, the conversion means responsive to the first clock signal for converting the serial data signals into parallel data signals to be stored in the memory means.

6. The interface device of claim 5, wherein there are periods in the output video signals which do not contain valid data signals and the input video signals includes a synchronizing signal, the interface device further comprising:

decision means coupled to the serial-parallel conversion means the decision means responsive to the synchronizing signal to insure that only valid data signals from the input video signals are transmitted for storage in the memory means.

7. The interface device of claim 5, wherein the input video signal further comprises synchronizing signals to which the first clock means is responsive.

8. The interface device of claim 1, wherein the input video signal comprises synchronizing signals to which the first clock means is responsive.

9. The interface device of claim 1, wherein the memory means stores a predetermined number of data signals at each address and further comprising:

means for dividing the first clock signal by a predetermined number to provide a signal for controlling storage of data signals in the memory means.

10. The interface device of claim 1, wherein the control means further comprises:

gate means coupled between the write and the read counter means and the memory means, the gate means having the write address and the read address signals as inputs, the gate means responsive to the first clock signal to provide write addresses and read addresses to the memory means.

11. The interface device of claim 10, wherein the read/write control means provides a lead signal, and further comprising:

latch means coupled between the read counter means and the gate means for storing an address received from the read counter means, the latch means responsive to the read signal to transmit the read address means to the gate means.

12. The interface device of claim 11, wherein the first clock signal has a falling edge and a second clock signal has a rising edge, and wherein the read/write control means further comprises:

first differentiating means responsive to the falling edge of the first clock signal to provide an output;

second differentiating means responsive to the rising edge of the second clock signal to provide an output;

second latch means having the outputs of the first and second differentiating means as inputs, the second latch means providing an output signal when the input signals do not occur at the same time and a delay output signal when the input signals occur at the same time; and means responsive to the output signal of the latch means and the clock signal to provide the read signal.

13. The interface device of claim 11, wherein the read/write control means further comprises:

read address pulse changing means having the first clock signal and the second clock signals as inputs, the read address pulse changing means providing a delayed output signal when the clock signal and the asynchronous clock signal occur at the same time; and means responsive to the delay output signal and the clock signal to provide the read signal.

* * * * *